M. S. BORTHWICK.
Car Brake.

No. 96,542.  Patented Nov. 9, 1869.

Witnesses:

Inventor:
M. S. Borthwick

Attorneys.

United States Patent Office.

MARCUS S. BORTHWICK, OF MONTANA, IOWA.

Letters Patent No. 96,542, dated November 9, 1869.

IMPROVED RAILWAY-CAR BRAKE.

The Schedule referred to in these Letters Patent and making part of the same.

*To all whom it may concern:*

Be it known that I, MARCUS S. BORTHWICK, of Montana, in the county of Boone, and State of Iowa, have invented a new and improved Car-Brake; and I do hereby declare that the following is a full, clear, and exact description thereof, which will enable others skilled in the art to make and use the same, reference being had to the accompanying drawings, forming part of this specification.

This invention relates to improvements in car-brakes, and has for its object to provide a simple arrangement of devices, whereby the car-brakes, as now commonly arranged for operation by hand, may be brought to bear, by power derived from the moving wheels of the truck, when required, the said devices being so arranged that they may be brought into contact with the wheels, either by the brakeman on the platform of each car, or by one at either end of the train, all as hereinafter more fully specified.

Figure 1:
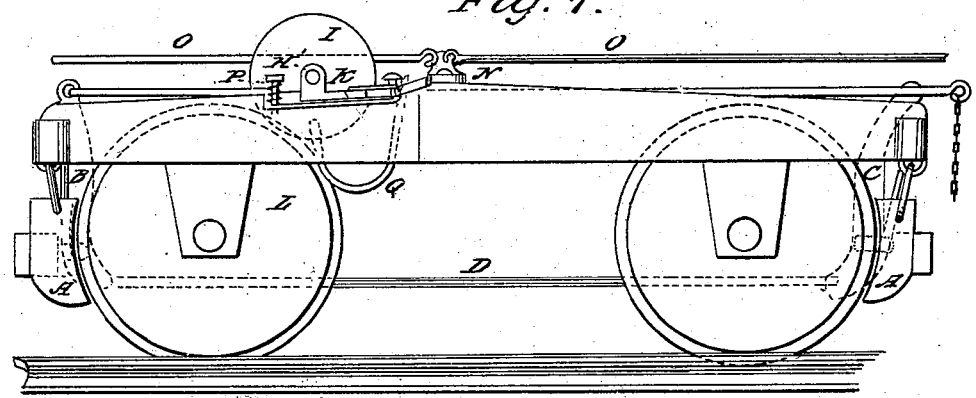
Figure 2:
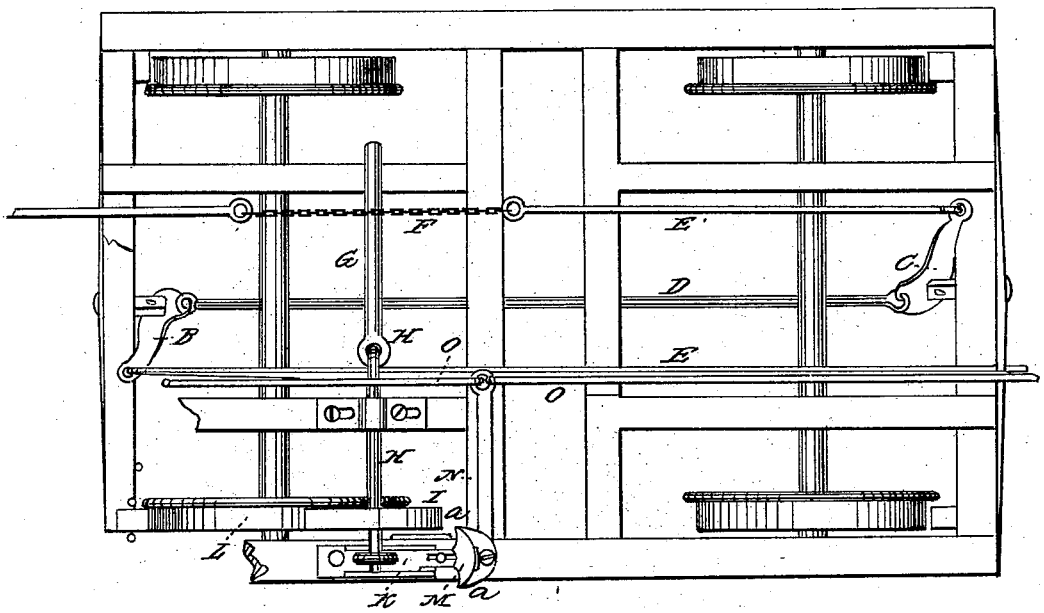

Figure 1 represents a side elevation of a truck with my improvements applied to it, and Figure 2 represents a plan view of the same, with a part broken out.

Similar letters of reference indicate corresponding parts.

The brakes A are suspended in the usual manner, and connected by levers B C and a rod, D.

They have also the rod E, connecting with the hand-winding shafts at one end of the car, and the rod E', connecting the lever C with a corresponding lever on the truck at the other end of the car.

In this rod E', I place a section of chain, F, connected to a winding-shaft, G, having a universal joint, H, and a friction-wheel, I, on the part H' of the shaft.

The outer bearing K of this shaft is made to slide, to bring the wheel into contact with one of the truck-wheels, L, by which the wheel I may be set into motion, and wind up the chain F, to draw the brakes down upon the wheels.

This slide K has a convex head, M, and is moved by a lever, N, having a concave side fitting the head of the lever, and so pivoted centrally between the points *a* of the concave side, that when the lever is moved either way, it will throw the slide K and the wheel I forward, or toward the wheel L.

The long arm of this lever N is provided with rods O, running in each direction. These rods may be connected to levers at each end of the platform, and the rods of each car may be coupled, making a continuation the whole length of the train, to be operated at either end or at any intermediate point.

P represents a spring for regulating the pressure of the wheel I on the wheel L, and Q is a retracting spring.

This attachment may be applied to any car-truck, as now arranged, and requires to be put on only one truck of a car, to operate the brakes of both trucks, the rod E' transmitting the motion to the brakes of the other truck.

The application of this device does not interfere with the working of the brakes by the winding-shafts and rods E, in the ordinary brake, as the joint H of the winding-shaft permits the proper movement for drawing up the levers C D and the brakes.

Having thus described my invention,

What I claim as new, and desire to secure by Letters Patent, is—

1. The combination, with the brakes A, levers B and C, and rods E' and E, of the jointed winding-shaft G H' and sliding friction-wheel I, substantially as specified.

2. The combination, with the wheel I and its shaft, of the convex-headed slide K, concave-faced lever N, and rods O, substantially as specified.

3. The combination, with the slide K and wheel I, of the spring P, substantially as specified.

MARCUS S. BORTHWICK.

Witnesses:
WM. H. ADAMS,
JAMES W. CAMPBELL.